July 3, 1962 R. E. GIBSON ETAL 3,042,880

BRIDGE-STABILIZED OSCILLATOR

Filed Sept. 17, 1958 2 Sheets-Sheet 1

ROBERT E. GIBSON
SHOLLY KAGAN
INVENTORS

BY Alden D Redfield
Abraham Ogman
ATTORNEYS

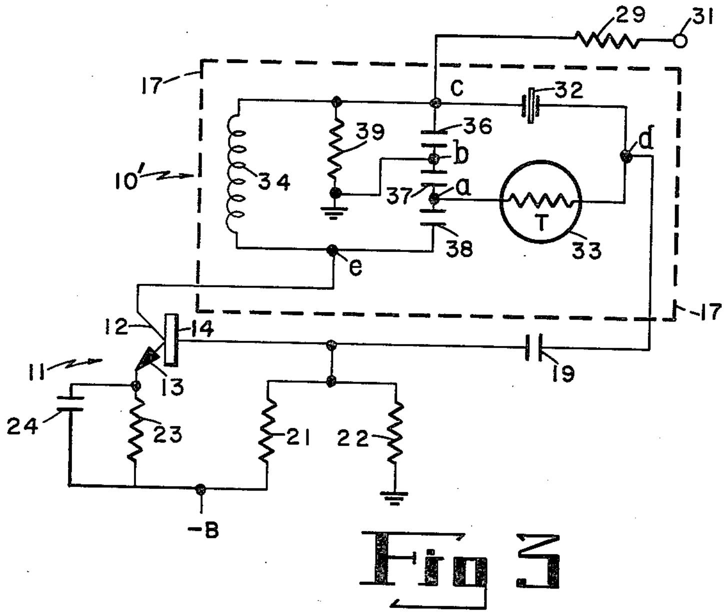
Fig 3
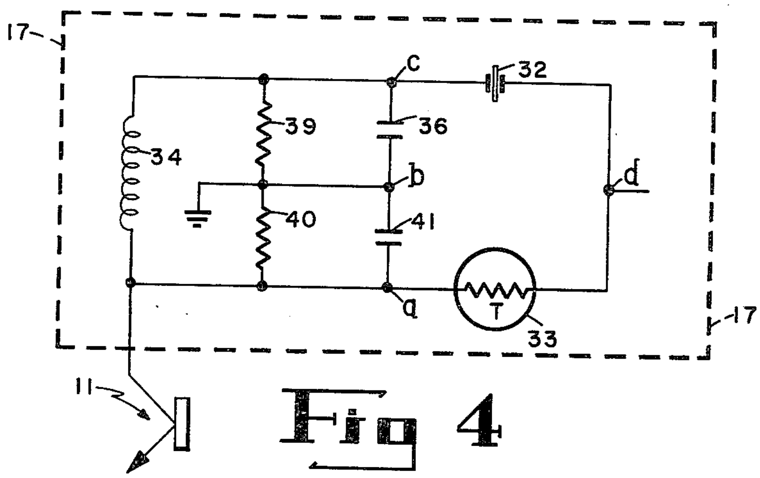
Fig 4
| POINT | VOLTAGE TO GROUND |
|---|---|
| a | -1.1V |
| b | 0V |
| c | +1.1V |
| d | +0.1V |
| e | -10.0V |
Fig 5
ROBERT E. GIBSON
SHOLLY KAGAN
*INVENTORS*
BY Alden D Redfield
Abraham Ogman
ATTORNEYS

United States Patent Office 3,042,880
Patented July 3, 1962

3,042,880

BRIDGE-STABILIZED OSCILLATOR

Robert E. Gibson, Burlington, and Shelly Kagan, Boston, Mass., assignors to Avco Manufacturing Corporation, Cincinnati, Ohio, a corporation of Delaware Filed Sept. 17, 1958, Ser. No. 761,642
8 Claims. (Cl. 331—110)

This invention relates to an improved bridge-stabilized oscillator. In particular the invention makes use of a tuned circuit and a bridge network which are coupled together by common impedance components.

In the well known Meacham bridge-stabilized oscillator, described in Patent Number 2,163,403, the oscillator contains an amplifier and a regenerative feedback circuit therefor. The latter includes a Wheatstone bridge, two arms of which include resistor elements, another arm contains a resistance element whose resistance is a function of its temperature for controlling the amplitude of the oscillations and the remaining arm includes a frequency determining element. The output of the amplifier is coupled through a transformer across one diagonal of the bridge network, and the other diagonal of the bridge network is coupled through a second transformer to the input of the amplifier.

Fundamental to the operation of the Meacham bridge-stabilized oscillator are the use of the aforementioned transformers which provide a required unbalanced to balanced transformation. These transformers, however, are responsible for several undesirable operational limitations. In the first place, the Meacham oscillator can not be used to generate signals above one megacycle because it is impractical to build "resistive" transformers above this frequency. By "resistive" it is meant that there is no phase shift when a signal is translated through the transformers. This condition is necessary for the operation of the bridge-stabilized oscillator because the transformers are in the regenerative feedback loop and contribute to the total loop phase shift.

An important consideration when attempting to eliminate the coupling transformers is the necessity for matching the impedance of the bridge network, which is often very low, to the normally high output impedance of the amplifier. In bridge-stabilized oscillators where coupling transformers are eliminated, the impedance matching problem is solved by including additional amplifier stages, notably cathode followers. The necessity for furnishing an additional stage of amplification, however, greatly increases the complexity of the circuit.

It is an object of the invention to provide an improved bridge-stabilized oscillator which avoids one or more of the aforementioned limitations and disadvantages.

It is another object of the invention to provide a new and improved bridge-stabilized oscillator that is capable of operating over a higher and a wider frequency range than known oscillators of this type.

It is still another object of the invention to provide a new and improved stabilized oscillator having a substantially smaller number of components than heretofore required.

It is yet another object of the invention to provide a new and improved bridge-stabilized oscillator which includes a resonant circuit that is coupled to a bridge network by common impedances.

Finally, other objects of the invention are to provide a new and improved bridge-stabilized oscillator which:

(1) Eliminates the requirement of transformers or additional amplifiers in the regenerative feedback loop.

(2) Utilizes low loss reactive elements in the bridge network.

The present invention is directed to a bridge-stabilized oscillator which comprises an amplifying element having input and output circuit means. The oscillator also includes a regenerative feedback circuit therefor, the feedback circuit including bridge means coupled to the input circuit means, and a resonant circuit coupled to the output circuit means. A portion of the resonant circuit comprises two arms of the Wheatstone bridge to complete the feedback loop.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 3 is a schematic representation of another form of bridge-stabilized oscillator embodying the principles of the present invention;

FIG. 4 is a schematic representation of still another form of a combined resonant circuit and bridge network; and FIG. 5 is a chart showing assumed relative values of voltages appearing at various points in the FIG. 1 circuit.

Figure 1:
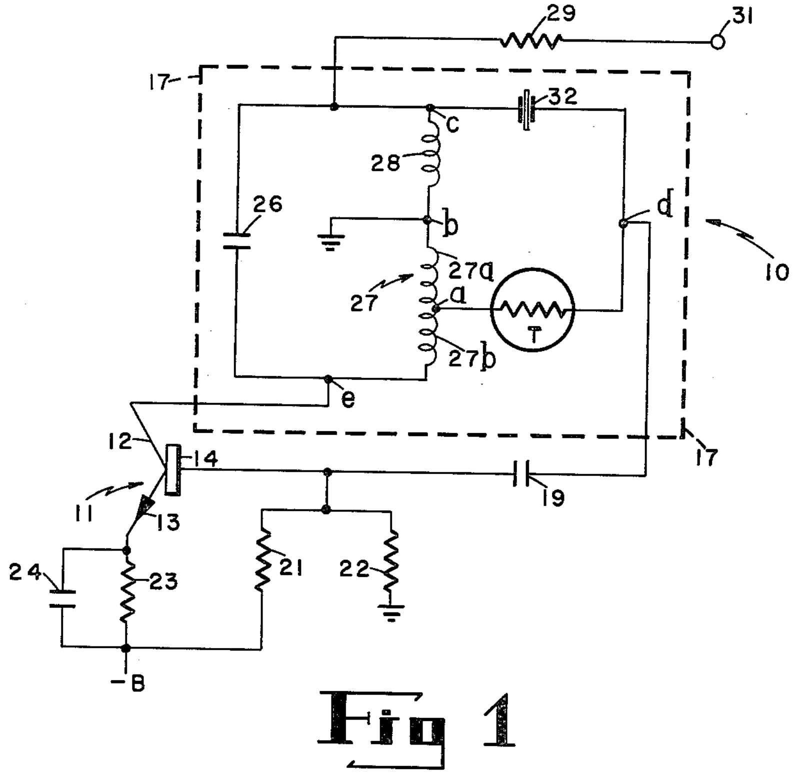
FIG. 1 is a schematic representation of a preferred bridge-stabilized oscillator embodying the principles of the present invention.

*Description of FIG. 1 Bridge-Stabilized Oscillator*

Referring to FIG. 1 of the drawings there is shown a schematic representation of a preferred embodiment of a bridge-stabilized oscillator 10 embodying the principles of the present invention. The oscillator 10 includes an amplifying element 11, preferably a transistor, although an electron discharge device is equally satisfactory. Transistor 11 includes a collector 12, an emitter 13 and a base 14. The collector 12, comprising an output circuit means, of the transistor 11, is coupled to a regenerative feedback circuit 17. The base 14 comprising an input circuit means of the transistor 11, is coupled through a capacitor 19 to the regenerative feedback circuit 17. Also connected to base 14 and forming part of the input circuit means is a biasing voltage divider network comprising two resistors 21 and 22 connected in series between a source of negative supply potential —B and ground. The junction between resistors 21 and 22 is connected to base 14. As is well known, to achieve the maximum benefit from a bridge-stabilized oscillator the amplifying element, or transistor 11, is biased class A. The emitter 13 is coupled through a resistor 23 to the —B supply potential and provides some D.C. stabilization. The resistor 23 is bypassed by a capacitor 24 which furnishes the necessary low impedance path around resistor 23 for the oscillator signal.

The feedback circuit 17 includes a parallel resonant circuit comprising the load impedance for the collector 12. It includes a capacitor 26, a tapped inductance 27 comprising sections 27*a* and 27*b*, and a series inductance 28. The internal collector capacitance is part of the over-all capacity of the resonant circuit and is thereby prevented from affecting the phase of the signal generated at the collector. One end of the parallel resonant circuit is coupled to the collector 12 while the other end is coupled through a resistor 29 to a signal output terminal 31.

The regenerative feedback circuit also includes a Wheatstone bridge network, two arms of which are formed by inductance 27*a* in series with inductance 28. The junction *"b"* of the aforementioned inductances 27*a* and 28 are tied to ground. The remaining arms of the bridge include a frequency determining element, shown preferably as a crystal 32, and a resistive component 33. As is conventional in bridge-stabilized oscillators of this type, the resistive element 33 is preferably a temperature responsive resistor, viz., one whose resistance is a function of its temperature. The thermal responsive resistor 33, or thermistor as it is widely known, acts to control the amplitude of the oscillation signal. The use of the crystal 32 and the thermistor 33 do not form part of this invention and a full discussion of the operation of these components may be found in the aforementioned Meacham patent.

The bridge terminals have been further identified, in FIG. 1, by the symbols "*a*," "*b*," "*c*," and "*d*." The diagonal "*a*," "*c*" constitutes a balanced input to the bridge, and the diagonal "*b*," "*d*" constitutes an unbalanced output from the bridge. It will be noted that point "*d*" is connected through capacitor 19 to the amplifier transistor 11. The purpose of capacitor 19 is to prevent direct current from passing through the thermistor 33 of the bridge network to the base 14 of the transistor 11. The crystal 32 prevents direct current from passing through the thermistor 33, thus assuring that its resistance will be determined solely by the oscillator signal amplitude.

*Operation of FIG. 1 Bridge-Stabilized Oscillator*

An important consideration in this, as in any other oscillator, is the necessity for having a zero phase shift between the input and output of the amplifying element. In the present invention the signal applied to the base 14 is shifted 180 degrees in phase when it is amplified by transistor 11. In order to function properly an additional 180 degrees shift must be provided by the feedback circuit 17. Another fundamental condition for the bridge-stabilized oscillator is that the components making up the bridge be resistive so that their impedance values will not be a function of frequency. Finally, provision must also be made for matching the amplifier circuitry to the bridge network, because in general, the crystal or frequency determining element has a substantially lower impedance than the load impedance of the amplifier. The manner in which oscillator 10 satisfies the aforementioned conditions will be discussed below.

The bridge type stabilized oscillator 10 performs in a manner similar to the Meacham oscillator. The amplifier is biased class A to provide a pure wave form and the bridge network is substantially balanced. The required 180 degree phase shift, as shown by Meacham, is developed by unbalancing the bridge a slight amount. The magnitude of unbalance in the bridge required to operate the oscillator is extremely small and is related to the gain of the amplifier. The resonant circuit is adjusted to the frequency of the series resonant mode of the crystal. Initially, it will be assumed that the oscillator 10 is functioning under stabilized conditions. This is an entirely reasonable assumption since the oscillator 10 builds up to a stabilized condition in the manner of a conventional bridge-stabilized oscillator.

To complete this disclosure it is merely necessary to show that the common reactive elements function as resistors, and to show how the impedance of the bridge network is matched to the impedance of the collector circuit. In this connection, it will be noted that when the oscillator 10 is operating, the resonant circuit as is customary, functions as a resistive element. It will be obvious to one skilled in the art that the impedance of the resonant circuit, its effective resistance, at its resonant frequency is equal to the inductive reactance multiplied by the Q of the resonant circuit.

The tapped inductance 27 in conjunction with the inductance 28 comprises an impedance divider chain for stepping down the overall effective resistance of the tank circuit to match the resonant circuit to the bridge network. The effective resistance of the inductances 27*a* and 28, although not proportional to the inductances of these respective components are related to them and may be easily ascertained. The magnitude of inductances 27*a* and 28 are chosen to furnish effective resistances in the same proportion as the impedances of the crystal 32 and the thermistor 33. The aforementioned ratio in most applications will differ from unity but under certain conditions where the crystal impedance equals the thermistor impedance, the effective resistances of the inductance 27*a* will be equal to that of the inductance 28. To facilitate the impedance matching operation inductance 27*a* is mutually coupled to inductance 27*b*. There is no mutual coupling between inductances 27 and 28, again to facilitate matching impedances.

A typical cycle of operation will now be described using assumed values of signal voltage and an amplifier gain of 100. To simplify tracing the signal through the oscillator 10, the voltages at the terminal points "*a*" through "*d*" of the bridge network and point "*e*" will be discussed. Initially, a 0.1 volt signal is assumed to be applied to the base 14 or input of the transistor 11. This signal is amplified 100 times and reversed in phase by transistor 11 and appears as a −10 volts signal at point "*e*" (all voltages are taken with respect to ground). The effective resistance of the inductance 27*a* with respect to the total effective resistance of the total inductance 27 is such that a −1.1 volt signal appears at point "*a*." If we assume that the impedance of the crystal 32 is substantially equal to the thermistor 33 resistance, the effective resistance of inductance 28 is equal to that of inductance 27*a* and a positive 1.1 signal appears at point "*c*." Because of the slight unbalance existing in the bridge network, created by making the resistance of crystal 32 slightly smaller than the resistance of thermistor 33, there is produced at point "*d*" a 0.1 volt signal. This signal, it will be noted is opposite in phase to the signal developed at the output of the transistor 11, at point "*e*" and, therefore, the same phase as the originally assumed input signal. The 0.1 volt signal at point "*d*" is coupled through capacitor 19 to base 14 thereby completing the regenerative loop. A chart showing the voltages just discussed is provided in FIG. 5.

Figure 2:
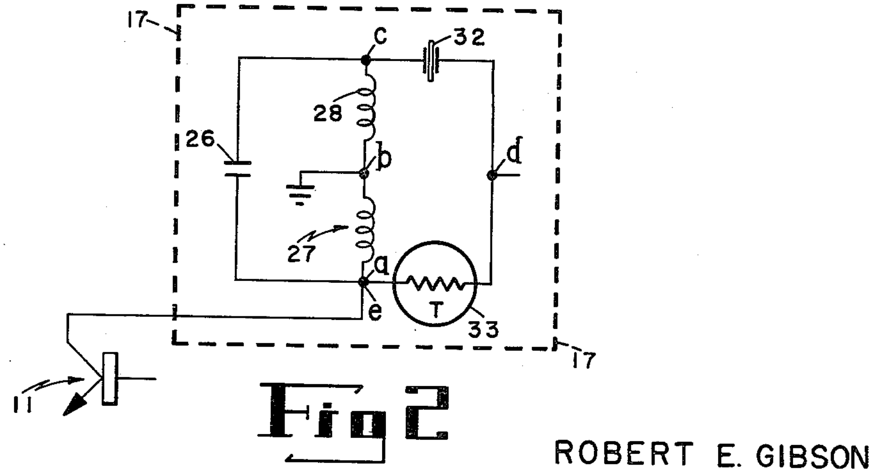
FIG. 2 is a schematic representation of a second form of the combined resonant circuit and bridge network.

In FIG. 2 of the drawings there is represented a schematic representation of another form of a combined resonant circuit and bridge network or regenerative feedback circuit 17. Many of the elements in the FIG. 2 and the subsequent FIGS. 3 and 4 correspond to components of the FIG. 1 circuit. Accordingly, these similar components are designated by the same reference numerals. The FIG. 2 circuit has particular application where crystal 32 has a high impedance and the bridge network may be coupled directly, without a change in impedance level, to the resonant circuit. In this case inductances 27 and 28 furnish effective resistances in the same ratio as the impedances of the crystal and the thermistor, and also comprise the total effective resistance of the resonant circuit.

*Description and Operation of FIG. 3 Oscillator*

Shown in FIG. 3 is another form of bridge-stabilized oscillator embodying the principles of this invention. The FIG. 3 oscillator, designated 10′, differs from the previously discussed FIG. 1 oscillator 10 in that the common impedance components coupling the resonant circuit through the bridge network are capacitors instead of inductances. As seen in FIG. 3 the resonant circuit comprises an inductance 34 in parallel with three capacitors 36, 37 and 38. The capacitors 36, 37, and 38 function in an analogous manner to the inductances 27*a*, 27*b* and 28 in FIG. 1, to provide impedance matching between the resonant circuit and the bridge network. A resistor 39 connected in parallel with capacitor 36 is required to complete a D.C. path to ground for the collector 12. Its resistance must greatly exceed the reactance of capacitor 36 to provent loading the resonant circuit. In all other respects the FIG. 3 oscillator 10′ is constructed and functions identically to the FIG. 1 oscillator 10.

Referring to FIG. 4 of the drawings there is shown still another form of a regenerative feedback circuit 17. The FIG. 4 circuit bears the same relationship to the FIG. 3 oscillator 10′ as the FIG. 2 circuit bore to FIG. 1 oscillator 10. It is designed for a high impedance crystal which may be coupled directly to the resonant circuit. Capacitor 41 is the counterpart of inductance 27 in FIG. 2. As had been previously discussed with relation to the FIG. 3 oscillator 10′ resistor 39 is provided to complete the direct current path for the collector 12 of the transistor 11. A resistor 40 shown connected between ground and point "*a*" is supplied merely to provide a second path for the direct current making it possible to reduce the total value of the resistance in the collector circuit without reducing the individual values of resistance in resistors 39 and 40.

When compared with existing bridge-stabilized oscillators, it will be readily apparent that the oscillators described herein have certain substantial advantages. It has been found that signals having frequencies at five megacycles have been successfully generated without impairing the excellent stability and freedom from distortion that are obtained with bridge-stabilized oscillators. A comparison will also show that the above described advantages are obtainable with a substantial reduction in the number of components used in constructing this circuit.

While the invention is not limited to any particular design constant, the following values are representative of the elements of the bridge-stabilized oscillator of FIG. 1, it being understood that the exact values of these components are dependent on the characteristics of the particular transistor used.

| | |
|---|---|
| Transistor 11 | 3N35. |
| Capacitor 19 | .01 micromicrofarads. |
| Capacitor 24 | .01 micromicrofarads. |
| Capacitor 26 | 470 micromicrofarads. |
| Inductance 27 | 2 microhenries. |
| Inductance 28 | .18 microhenries. |
| Resistance 21 | 5,600 ohms. |
| Resistance 22 | 10,000 ohms. |
| Resistance 29 | 820 ohms. |
| Thermistor 33 | 500 ohms at 75° C. |
| Crystal 32 | Bliley B661A—Frequency 5 megacycles—series resistance 100 ohms. |

Impedance ratio of thermistor 33 to crystal 32–5 to 1.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A bridge-stabilized oscillator circuit comprising:
(*a*) amplifying means having input and output circuit means;
(*b*) first, second and third series-connected reactances;
(*c*) a fourth reactance coupled in parallel with said first, second and third reactances to form a resonant circuit therewith; and
(*d*) a crystal and a resistance connected in series, the combination being coupled in parallel with said first and second reactances, respectively, the junction of said resistance and said crystal being coupled to said input means, the junction of said fourth reactance and said third reactance being coupled to said output means.

2. A bridge-stabilized oscillator circuit described in claim 1 in which said second and third reactances comprise portions of a tapped reactance.

3. A bridge-stabilized oscillator circuit as described in claim 1 in which said first, second and third reactances are inductors and said fourth reactance is a capacitor.

4. A bridge-stabilized oscillator circuit as described in claim 1 in which said first, second and third reactances are capacitors and said fourth reactance is an inductance.

5. A bridge-stabilized oscillator circuit comprising:
(*a*) an amplifying means having an input and output circuit means;
(*b*) bridge means including two adjacent reactance arms coupled in parallel with a crystal connected in series with a resistor, said crystal and said resistance forming the two remaining arms of said bridge means, the junction of said resistor, and said crystal being coupled to said input means, the ends of said resistor removed from said junction being coupled to said output means; and
(*c*) a third reactance coupled in parallel across said adjacent reactance arms which together with said reactance arms forms a resonant circuit.

6. A bridge-stablized oscillator circuit as defined in claim 5 in which said reactance arms are inductors, and said third reactance is a capacitor.

7. A bridge-stabilized oscillator as defined in claim 5 in which said reactance arms are capacitors, and said third reactance is an inductance.

8. A bridge-stabilized oscillator circuit as defined in claim 5 wherein said resistor is a temperature variable resistance element.

References Cited in the file of this patent

UNITED STATES PATENTS

| | | |
|---|---|---|
| 2,163,403 | Meacham | June 20, 1939 |
| 2,570,840 | O'Brien | Oct. 9, 1951 |
| 2,641,741 | Peterson | June 9, 1953 |
| 2,676,258 | Laidig | Apr. 20, 1954 |
| 2,764,643 | Sulzer | Sept. 25, 1956 |

OTHER REFERENCES

"Novel Circ. for a Stable Var. Freq. Osc." by Makow in Proc. IRE, pgs. 1031–1036, August 1956.